Aug. 15, 1939.  J. A. STREUN  2,169,667
BALING PRESS ATTACHMENT
Filed Nov. 5, 1937   5 Sheets-Sheet 1

Inventor
John A. Streun
By Cushman, Darby & Cushman
Attorneys

Aug. 15, 1939. J. A. STREUN 2,169,667
BALING PRESS ATTACHMENT
Filed Nov. 5, 1937 5 Sheets-Sheet 5

Inventor
John A. Streun
By Cushman, Darby & Cushman
Attorneys

Patented Aug. 15, 1939

2,169,667

UNITED STATES PATENT OFFICE 2,169,667

BALING PRESS ATTACHMENT

John A. Streun, Sherman, Tex., assignor to Hardwicke-Etter Company, Sherman, Tex., a corporation of Texas Application November 5, 1937, Serial No. 173,012

18 Claims. (Cl. 100—28)

The present invention relates to an improved retaining dog attachment for cotton presses and the like.

In cotton presses of the one-story type, the press boxes are rotatably mounted on a center post so that the cotton may be supplied to one of the boxes and packed therein by a tramper while the cotton in the other box is being compressed by a ram. Movable dogs associated with the press boxes act to retain the cotton during the tramping operation and until the box is rotated and positioned either under or above the ram to pack and bale the cotton.

Heretofore, in devices of this character, various means have been used for actuating and maintaining the dogs in different positions relative to the press boxes. While such devices hold the cotton down during the tramping operation, they have not proved entirely satisfactory since they lack means for preventing the bagging or bale covering from being torn or damaged by the dogs during the movement of the ram into and out of the press box.

Accordingly, an important object of the present invention is to provide a dog attachment for cotton presses which will insure the dogs being moved and maintained out of the boxes during the pressing operation, so that the bagging carried by the ram head is not damaged or torn by reason of its engagement with the retaining dogs, and in which means are provided for moving the dogs back into their retaining position, as the box is returned under the tramper to receive the cotton. In other words, simple, efficient and positive means are provided for automatically moving the retaining dogs into and out of the press boxes so that the dogs are positioned out of the path of the ram head during the pressing operation and are freely disposed within the box during the tramping operation with the result that the bale issues from the press in a neat and undamaged package.

Other objects and advantages of the invention will become apparent from the following description when taken in conjunction with the claims and drawings.

Referring to the drawings which show a preferred embodiment of the invention,

Figure 1A is a sectional plane view taken along the line 1a—1a of Figure 1.

Referring to the drawings in which like numerals indicate like parts in the several views, 10 designates the frame of the press which is provided with a fixed center post or shaft 11. Double press boxes 12 and 13 are rotatably mounted on the shaft 11 to be alternately moved beneath the reciprocating tramper 14 and the ram head 15 (Fig. 1), so that the cotton as it is fed from the condenser through the pipe 16 (Fig. 6) into the hopper 17, will be conducted by the tramper 14 into the press box beneath the same and when the press box is turned about the shaft 11, it will be positioned beneath the ram head 15 for the purpose of packing and baling the cotton.

Each of the press boxes 12 and 13 is formed of spaced slats and is preferably divided into an upper fixed portion or section 18 and a lower open section or door 19, the sides of which are arranged to be opened or removed for the purpose of wrapping the bale of cotton and withdrawing the wrapped bale from the press. Rock shafts 20 associated with the opposite sides of the press boxes are carried by the spaced bearing brackets 21 fastened by the bolts 22 to the boxes adjacent their upper ends. The shafts 20 have spaced retaining dogs 23 non-rotatably secured thereto. Each dog is provided with an inwardly projecting arm or finger 24 arranged to extend inside the press box and to be retracted therefrom through the openings 25 between the slats. The retaining dogs 23 are also formed with weighted portions 26, which normally act to move the arms 24 into the box. A laterally projecting pin 23' extends from each of the dogs 23 and may carry a tubular rubber member 24' (Fig. 3) arranged to engage the sides of the boxes for limiting the inward movement of the dogs. The inner end of each rock shaft 20 has fastened thereto a depending member 27 (Fig. 4) provided with a lower cam surface 28, preferably shaped as shown, for controlling the position of the retaining dogs relative to the press boxes in a manner subsequently to be described.

Figure 2:
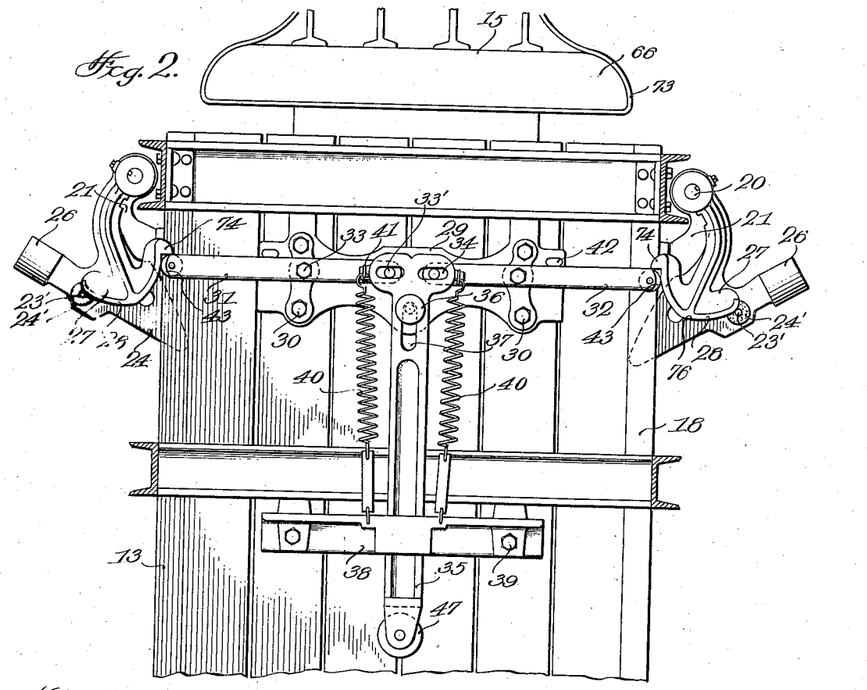
Figure 2 is an enlarged sectional view taken substantially along the line 2—2 of Figure 1.
Figure 3:
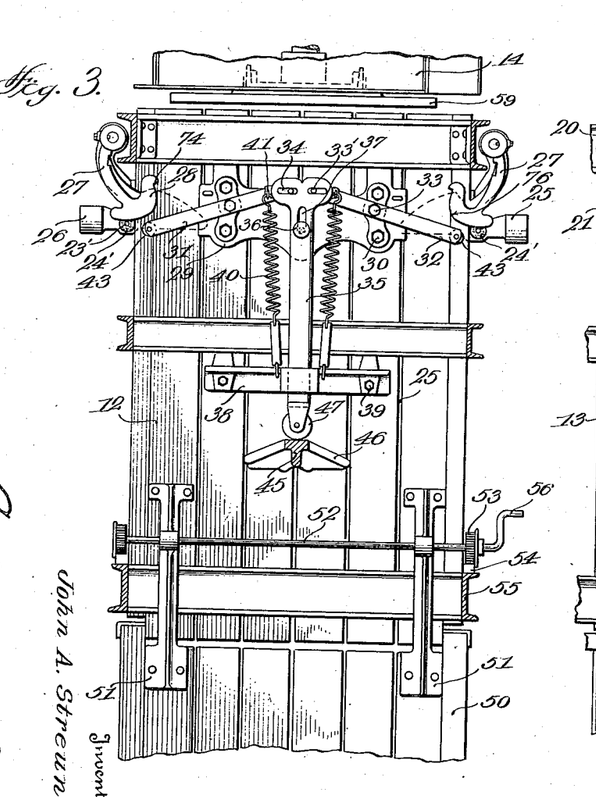
Figure 3 is an enlarged sectional view taken substantially along the line 3—3 of Figure 1.
Figure 4:
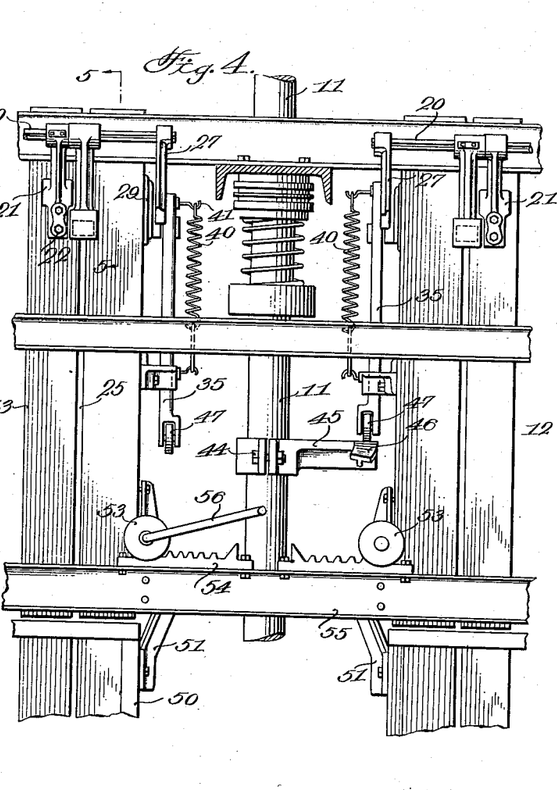
Figure 4 is an enlarged detail view of portions of Figure 1.

The inner or opposed ends of the boxes 12 and 13 each has a plate 29 (Fig. 3) secured thereto by the bolts 30. A pair of levers 31 and 32 are pivoted as at 33 to each of the plates 29 and are provided at their inner ends with laterally projecting pins 33' which loosely extend into elongated slots 34 in a vertically reciprocating plunger or control member 35. A retaining pin or stud 36 extending outwardly from the plate 29 is movable in a vertical slot 37 in the plunger 35. The lower end of the plunger 35 loosely extends through a guide bracket 38 secured to the inner end of each of the boxes 12 and 13 by the bolts 39. Coil springs 40 are connected at their lower ends to the bracket 38, and have their upper ends connected as at 41 to the levers 31 and 32, respectively. Lugs 42 on the plate 29 act to limit the upward movement of the levers 31 and 32, to maintain the levers in substantially horizontal alignment at predetermined intervals during the operation of the press. The outer ends of the levers 31 and 32 carry rollers 43 arranged upon the actuation of the levers to be moved in engagement with the cam members 27 for actuating the rock shafts 20 to move and maintain the retaining dogs 24 out of the inside of their associated press boxes during the pressing and bale covering operations. The center post 11 on the side adjacent the tramper 14 has clamped thereto as at 44, a step bracket or segmental member 45 having a curved track 46 which inclines upwardly from its ends towards its center (Fig. 3). The track 46 is positioned to engage a roller 47 journalled in the lower end of the plunger 35 for the purpose of moving the latter upwardly against the pressure of the springs 40, to actuate the levers 31 and 33, so that their outer ends are moved downwardly away from the cams 28 to permit the free movement of the retaining dogs for holding the cotton within the press box during the tramping operation. It will be seen that when the press box positioned beneath the tramper 14 has been filled and the same rotated about the shaft 11 to be positioned beneath the ram 15, the plunger 35 will be moved out of engagement with the track 46, with the result that the springs 40 will exert a downward pressure on the inner ends of the levers 31 and 32 to move the outer ends of the levers upwardly to the position shown in Figure 2, which movement is limited by the engagement of the levers with the lugs 42. As the rollers 43 on the levers 31 and 32 engage the cams 28 of the members 27, they will exert an outward pressure on the members 27 which, in turn, rock the shafts 20 to move the retaining dogs 23 out of the press box and the path of the ram head 15.

The sides and ends of the lower sections 19 of each of the press boxes may be opened for the purpose of withdrawing the packed cotton from the press in any suitable manner and, as shown, each box is provided with a pair of spaced retaining bars 48 which extend longitudinally from opposite sides of the box, and have their inner ends 49 (Fig. 1) journalled on reduced portions of the shaft 11, so as to be capable of swinging away from the bale to permit the withdrawal of the latter from the press. The lower removable ends 50 of each of the press boxes (Fig. 3) have fastened thereto the upwardly projecting spaced brackets 51 which support a transverse shaft 52 having pinions 53 that mesh with the racks 54 on the sill 55 of the press frame. One end of the shaft 52 has a handle 56 which, upon being actuated, causes the movement of the ends 50 of the box relative to their upper sections. Latch rods 57 secure the outer ends of the bars 48 of each box together and are controlled by a handwheel 58 to permit the disconnection of the rods from the bars 48, so that the latter may swing about the shaft 11 to effect the dismantling of the lower sections 19 of the press boxes. The hand wheel 58 is mounted on a spindle or shaft 58' which may be operatively connected to a vertically disposed revoluble shaft 57' in any suitable manner, such as by providing the spindle 58' with a worm which meshes with a worm segment on the shaft 57' (not shown) so that the turning of the hand wheel acts to rotate the shaft 57'. The opposite ends of the shaft 57' are each provided with lugs (not shown) which releasably engage the adjacent ends of the latch rods 57, so that upon the turning of the hand wheel 58 in a counterclockwise direction the lugs will act to pull the tie rods to maintain the doors in their closed position. Conversely, when the hand wheel is rotated in a clockwise direction it is released from the latch rods to permit the doors to be opened.

The tramper 14 preferably comprises spaced slats 59 having openings 60 which align with the dogs 24, so that the tramper may be withdrawn from the box beneath the same without disturbing the retaining position of the dogs. The tramper is operatively connected by the arms 61 to any suitable driving means not shown, for imparting a reciprocating movement thereto during the operation of the press, and may be provided with the guide bars 62 which extend through fixed members 63 mounted on the tramper sill 64.

The ram 15 is operatively connected to a hydraulic cylinder 65 and is provided with spaced depending blocks 66 having openings 67 for receiving the tie rods or fastening means which are wrapped around the bale after the completion of the pressing operation.

An operating lever 68 (Fig. 1) is connected through the shaft 69 and the mechanism generally indicated at 70, for raising the press to permit the boxes 12 and 13 to be alternately positioned beneath the tramper 14 and the ram 15. A manually operable retaining latch 71 may be provided for engaging the top of the press to maintain the parts in a fixed position during the tramping and pressing operations and which, upon being released, will permit the boxes to be rotated upon the actuation of the handle 68.

Figure 1:
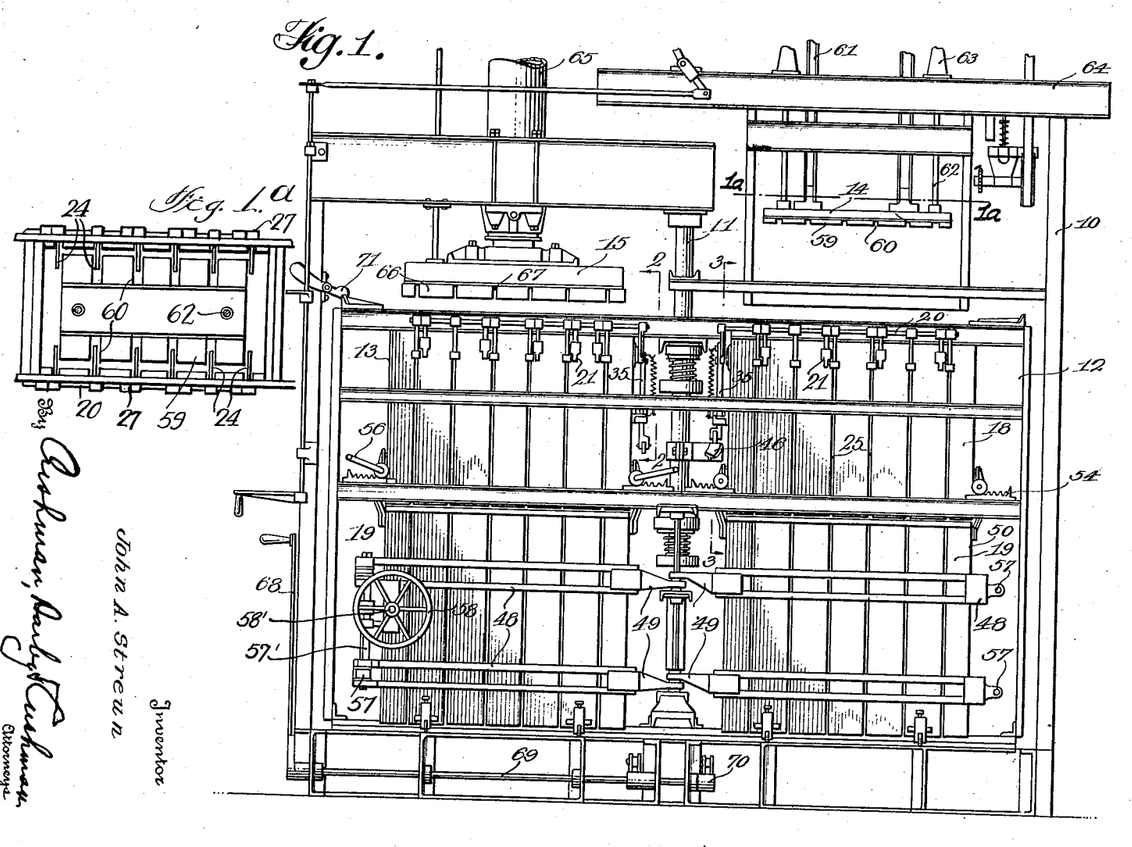
Figure 1 is a side elevation of a cotton press provided with my invention.
Figure 6:
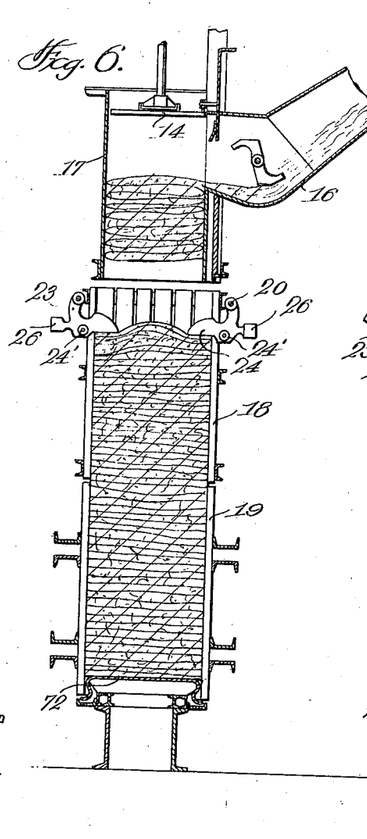
Figures 6 to 8 inclusive are diagrammatic views showing the various positions of the tramper and its associated parts during the filling and packing operation, and Figures 9 to 12 inclusive are diagrammatic views showing the various positions of the ram head and its associated parts during the pressing and baling operations.

In operating the press, it will be assumed that the parts are in the position as shown in Figure 1 with the press box 12 positioned beneath the tramper 14 and the box 13 below the ram 15. A bagging or bale covering 72 is first placed in the bottom of the press box, so as to assume the position as shown in Figure 6. As the cotton is conducted through the pipe 16 from the condenser into the hopper 17, the tramper 14 is moved to its upper position as shown in Figure 6 and is subsequently actuated to move the cotton in the hopper into the box 12. As soon as the tramper foot pushes the cotton past the dogs 23, the dogs due to the weighted members 26, swing back into the box and have their inward movement arrested by the stops 24'. The openings 60 between the tramper blocks permit the return movement of the tramper without affecting the retaining position of the dogs, so that the latter maintain a firm hold on the cotton in the box and hold it down to make room for another charge of cotton when the same is fed into the box. This operation is repeated until the box is completely filled. It will be observed that the plunger 35 associated with the box 12 now engages the track 46, so that the levers 31 and 32 are moved to the position shown in Figure 3 and out of engagement with the cams 28 of the members 27, with the result that the dogs 23 are freely movable into and out of the box 12.

Figure 7:
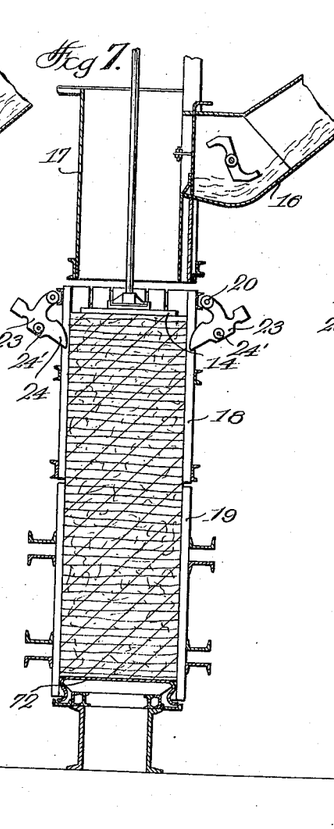
Figure 8:
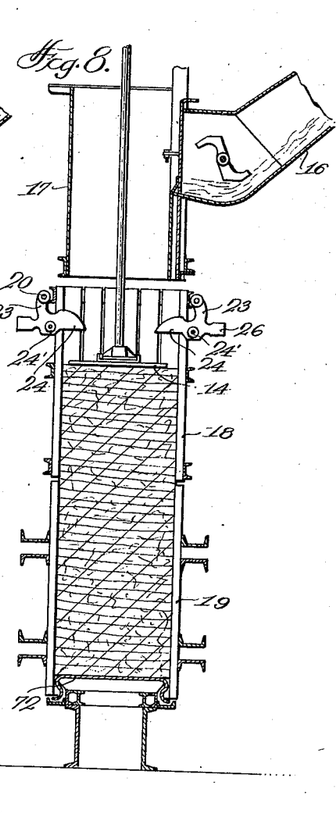
Figures 9, 10:
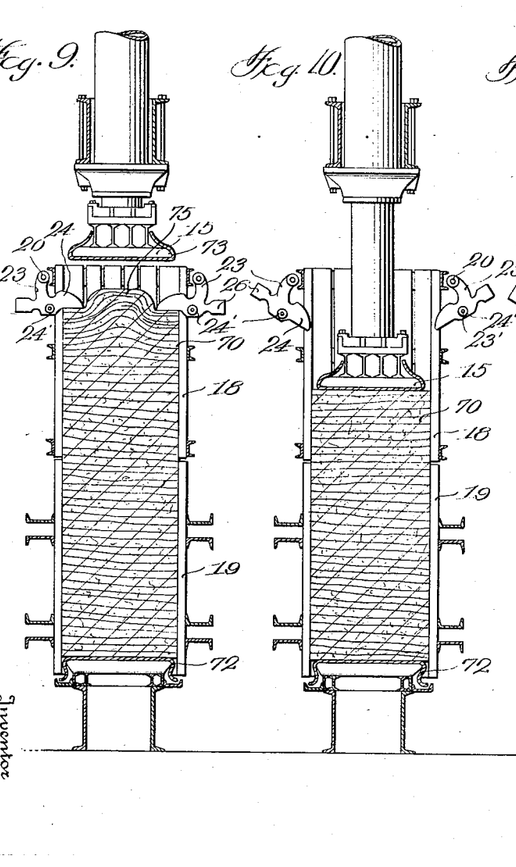

As the cotton in the hopper 17 is forced into the box 12 by the tramper 14, the pressure thereof causes the dogs 27 to swing outwardly (Fig. 7) and as the tramper passes the dogs, the latter will, by reason of the weighted members 26, be returned into the box, so that, upon the tramper being withdrawn, the upward expansive pressure of the cotton 70 will be arrested by reason of the cotton engaging the underside of the dogs (Fig. 9).

The latch 71 is then released and the shaft 68 actuated so that the box 12 with the cotton therein can be moved under the ram 15 and at the same time the empty box 13 can be positioned under the tramper 14. During this rotative movement of the boxes, the plunger 35 on the box 12 is moved away from the track 46, so as to assume the position, as shown in Figure 2, thus moving the levers 31 and 32 thereof to their horizontal position. During this movement, the plunger 35 on the box 13 is brought in engagement with the track 46, so that the levers 31 and 32 associated therewith assume the position shown in Figure 3, thus permitting the free swinging movement of the dogs within the box during the filling of the same by the tramper 14.

A bagging or bale covering 73 is then fastened to the ram 15 and, as the latter is moved downwardly, it compresses the cotton in the box 12 and at the same time imparts an initial outward movement to the dogs 23. This movement of the dogs coacts with the springs 40 to cause the rollers 43 which are now in engagement with the medial portions 76 of the cams 28 to move upwardly and engage the shoulders 74 on the members 27, so that the levers 31 and 32 will maintain the fingers 24 of the dogs out of the path of the ram 15 and the bale covering 73 during the pressing operation and thus prevent damaging or tearing of the bagging.

It will be seen that the pressure required to move the dogs outwardly relative to the press box is very light, since the movement of the ram 15 acts to release the upper pressure on the dogs and only slight pressure from the bagging is required to push the dogs out, so that the rollers 43 immediately shove the cams 28 outwardly to actuate the rock shaft 20 and the dogs 23. This movement is assisted by the downward pull of the springs 40 on the inner ends of the levers. In other words, after the bale in the box 12 has been tramped and the press boxes turned to position the box under the ram 15, and the box 13 under the tramper 14, the roller 47 on the plunger 35 rolls off of the step bracket 45 and the springs 40 act to move the inner ends of the levers 31 and 32 downwardly. When the box 12 is positioned beneath the ram 15, a portion 75 of the cotton 70 is forced up above the dogs 23 and as the ram 15 descends, the pressure imparted to the cotton starts the outward swinging movement of the dogs. During this movement the springs 40 are exerting a downward pressure on the plunger 35, which moves the dogs 23 only a relatively short distance before the rollers 43 which are now in engagement with the medial cam portions 76 of the members 27, ride over these portions, and engage the shoulders 74 with the result that the spring pressure immediately moves the dogs outwardly to the position shown in Figure 10. The dogs are retained in this position during the pressing operation, so as to provide a clear, uninterrupted passage for the ram head to be withdrawn from the box without damaging or tearing the bagging. It will be observed that during the pressing operation the retaining dogs do not release their hold on the cotton until the ram is moved down to and past the dogs, thus avoiding the objectionable feature of releasing the dogs before the press boxes are located in their registering positions. Moreover, the release of the dogs is effected by the pressure exerted by the ram on the upper exposed portion of the cotton (Figure 9), thus dispensing with the use of trip or manually operable means for actuating the dogs. By this novel arrangement of parts means are provided for moving aand maintaining the retaining dogs out of the boxes during the pressing operation so that the ram can operate without tearing the bagging and without danger of breaking or bending the dogs.

Figure 11:
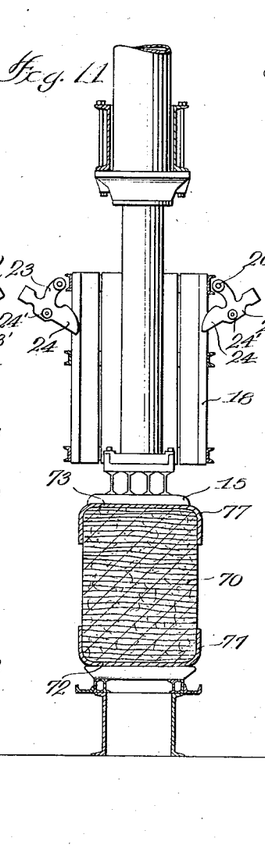

After the bale has been pressed, the sides of the lower section 19 are removed by the actuation of the wheel 58 and the shaft 52 associated with each of the press boxes. The lower bale covering 72 and the upper bale covering 73 are then turned inwardly as at 77 against the sides of the bale, while the ram 15 continues to maintain the bale in its compressed position (Fig. 11). Cotton ties (not shown) are then inserted through the openings 67 between the blocks 66 of the ram and between similar slots in the bottom of the box section 19, so that the bale may be tied in a pressed position with the bagging securely wrapped around the bale in order that when the pressure of the ram 15 is released, the cotton will assume a neat and compact shape, without any danger of damaging or tearing the bagging by reason of the engagement of the dogs 23 therewith.

Figure 5:
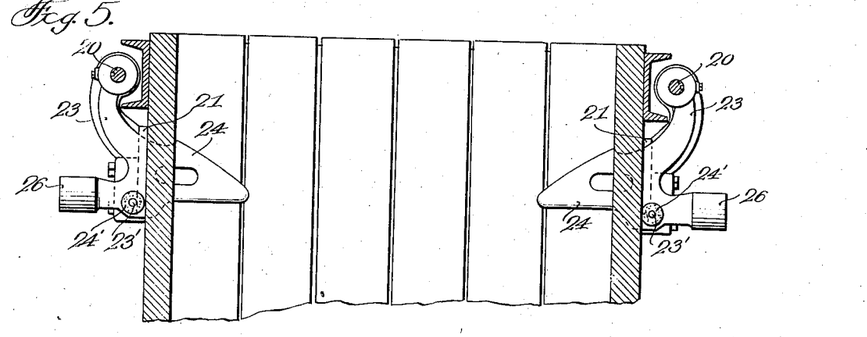
Figure 5 is a sectional view taken substantially along the line 5—5 of Figure 4.
Figure 12:
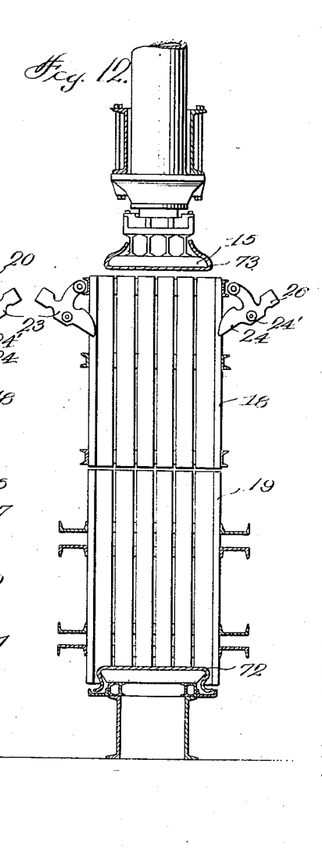

The bale is then withdrawn from the press and the lower sections are connected to the upper section (Fig. 12) and the ram 15 is withdrawn and a new bagging positioned in the bottom of the box and another applied to the ram. The empty box is then turned around to be positioned beneath the tramper 14. During this movement, the roller 47 on the plunger 35 rides up the bracket 46, thus moving the plunger 35 upward until the levers 31 and 32 are moved to the position as shown in Figure 3 and out of the path of the arms 27, thus permitting the free swinging movement of the dogs 23, so as to retain the cotton as the same is fed into the box beneath the tramper 14 in the manner as shown in Figure 5 and as previously described.

Thus, it will be seen that by reason of the novel construction and operation of the retaining dogs and their associated parts, simple, efficient and positive means are provided for maintaining the dogs out of the inside of the press box and the path of the reciprocating ram during the packing operation, and for releasing the dogs to permit their free movement within the press box during the tramping operation to effectively retain the cotton therein prior to it being positioned beneath the ram and pressed into a bale. Thus, when the packing operation is completed, the cotton is enclosed in a neat covering and is retained in its compressed position by the tie rods which enclose the same.

It is to be understood that the form of the invention shown and described is illustrative of a preferred embodiment and that such changes may be made without departing from the spirit of the invention as fall within the purview of one skilled in the art and the scope of the appended claims.

I claim:

1. In combination with a baling press having a tramper and a ram, a supporting post, press boxes rotatably mounted on said post and adapted alternately to be moved under the tramper and the ram, retaining dogs mounted on the sides of the press boxes and arranged to be extended into and to be retracted from said boxes, actuating means movably connected to the inwardly situated sides of each of said boxes, releasable means for operatively connecting the actuating means to the retaining dogs, said ram when brought in compressing engagement with the cotton initiating the outward movement of the dogs and yieldable means connected to the releasable means and operable upon the movement of one of the boxes beneath the ram for positioning the releasable means so as to coact with the ram to move the dogs out of the box.

2. In combination with a baling press having a tramper and a ram, a supporting post, press boxes rotatably mounted on said post and adapted alternately to be moved under the tramper and the ram, retaining dogs mounted on the sides of the press boxes and arranged to be extended into and to be retracted from said boxes, actuating control means movably connected to the inwardly situated sides of each of said boxes, releasable means for operatively connecting the actuating means to the retaining dogs, said ram when brought in compressing engagement with the cotton initiating the outward movement of the dogs, yieldable means connected to the releasable means and operable upon the movement of one of the boxes beneath the ram for positioning the releasable means so as to coact with the ram to move the dogs out of the box, and means upon the movement of the box away from the ram and the positioning of the box beneath the tramper for rendering the releasable means inoperative so as to permit the free movement of the dogs within the box during the tramping operation.

3. In combination with a baling press having a tramper and a ram, a supporting post, press boxes rotatably mounted on said post and adapted alternately to be moved under the tramper and the ram, retaining dogs mounted on the sides of the press boxes and arranged to be extended into and to be retracted from said boxes, actuating means movably connected to the inwardly situated sides of each of said boxes, releasable means for operatively connecting the actuating means to the retaining dogs, a bale covering removably connected to the ram and arranged to be applied to the bale upon the completion of the pressing operation, said ram when brought in compressing engagement with the cotton initiating the outward movement of the dogs, and means when one of the boxes is moved beneath the ram and the bale covering for positioning the releasable means so as to coact with the ram to move the dogs out of the path of the box so as to prevent injury to the bale covering during the pressing operation.

4. In combination with a baling press having a reciprocating ram, a press box, means for moving the press box beneath the ram, retaining dogs mounted on opposite sides of the press box and arranged to be extended into and to be retracted from the box, vertically disposed actuating means on one side of the box, said ram when brought in compressing engagement with the cotton initiating the outward movement of the dogs, releasable means operatively connecting the actuating means to the retaining dogs, and means when the box is moved beneath the ram for positioning the releasable means to coact with the ram to move the dogs to their retracted position.

5. In combination with a baling press having a reciprocating ram, a press box, means for moving and maintaining the press box beneath the ram, retaining dogs mounted on opposite sides of the press box and arranged to be extended into and to be retracted from the box, vertically disposed actuating means on one side of the box, releasable means operatively connecting the actuating means to the retaining dogs, said ram when brought in compressing engagement with the cotton initiating the outward movement of the dogs, yieldable means when the box is moved beneath the ram for positioning the releasable means so as to coact with the ram to move the dogs to their retracted position, and means upon movement of the box away from the ram for operating the actuating means to permit free swinging movement of the dogs within the box.

6. In combination with a baling press having a reciprocating ram, a press box, rock shafts mounted on opposite sides of the press box and having spaced fixed retaining fingers arranged to be extended into and to be retracted from the box, the inner ends of said shafts having depending cams, spaced transversely disposed levers pivotally connected to the box and having their outer ends arranged to move into and out of engagement with the cams for actuating the rock shafts, a vertically disposed reciprocating plunger operatively connected to the inwardly situated ends of the levers, said ram when brought in compressing engagement with the cotton initiating the outward movement of the dogs and yieldable means connected to the levers and to the box for positioning the levers in engagement with the cams so as to coact with the ram to move the fingers out of the box.

7. In combination with a baling press having a reciprocating ram, a press box, means for moving and maintaining the press box beneath the ram, rock shafts mounted on spaced sides of the press box and having spaced fixed retaining fingers arranged to be extended into and to be retracted from the box, the inner ends of said shafts having depending cams, spaced transversely disposed levers pivotally connected to the box and having their outer ends arranged to be moved into and out of engagement with the cams for actuating the rock shafts, a vertically disposed reciprocating plunger operatively connected to the inner ends of the levers, said ram having a bale covering removably attached thereto and arranged to be applied to the bale, said ram when brought in compressing engagement with the cotton initiating the outward movement of the dogs, yieldable means connected to the levers and to the box for moving the levers in engagement with the cams so as to coact with the ram to move the fingers in their retracted position, and means upon the movement of the box away from the ram for operating the plunger to move the levers out of engagement with the cams to permit the free swinging movement of the dogs within the box.

8. In combination with a baling press having a tramper and a ram, a central post, press boxes rotatably mounted on said post and arranged alternately to be moved under the tramper and the ram, rock shafts mounted on opposite sides of the press boxes and having spaced fixed retaining dogs adapted to be extended into and to be retracted from the press boxes, said ram when brought in compressing engagement with the cotton initiating the outward movement of the dogs, the inner ends of said shafts having depending cams, vertically disposed actuating means slidably connected to the inwardly situated sides of each of said boxes, displaceable means operatively connecting the actuating means to said cams, means when one of the boxes is positioned beneath the ram for lowering the actuating means whereby to position the displaceable means so as to coact with the ram to move the dogs out of the path of the ram during the pressing operation, and means on said post upon the turning of the press to position the box beneath the tramper for rendering the actuating means inoperative to permit the dogs to swing freely within the press box during the tramping operation.

9. In combination with a baling press having a tramper and a ram, a central post, press boxes rotatably mounted on said post and arranged alternately to be moved under the tramper and the ram, rock shafts mounted on opposite sides of the press boxes and having spaced fixed retaining dogs adapted to be extended into and to be retracted from the press boxes, the inner ends of said shafts having depending cams fastened thereon, a vertically disposed plunger slidably connected to the inwardly situated side of each of said boxes, spaced levers pivoted to the inner side of each box and operatively connected at their inner ends to said plunger, said levers arranged to be moved by the plunger in and out of engagement with said cams for moving the retaining dogs out of the boxes, said ram when brought in compressing engagement with the cotton initiating the outward movement of the dogs, and means when one of the boxes is positioned beneath the ram head for actuating the plunger whereby to position the levers to engage the cams and coact with the ram so as to move the dogs out of the box.

10. In combination with a baling press having a tramper and a ram, a central post, press boxes rotatably mounted on said post and arranged alternately to be moved under the tramper and the ram, rock shafts mounted on opposite sides of the press boxes and having spaced fixed retaining dogs adapted to be extended into and to be retracted from the press boxes, the inner ends of said shafts having depending cams fastened thereon, a vertically disposed plunger slidably connected to the inwardly situated side of each of said boxes, spaced levers pivoted to the inner side of each box and operatively connected at their inner ends to said plunger, said levers arranged to be moved by the plunger in and out of engagement with said cams for moving the retaining dogs out of the boxes, said ram when brought in compressing engagement with the cotton initiating the outward movement of the dogs, means when one of the boxes is positioned beneath the ram head for actuating the plunger whereby to position the levers to engage the cams and coact with the ram so as to move the dogs out of the box, and means on said post upon the turning of the press to position the box beneath the tramper for raising the plunger so as to move the levers out of engagement with the cams to permit the free swinging movement of the retaining dogs within the box.

11. In combination with a cotton press having a tramper and a ram, a center post, press boxes rotatably mounted on said post and adapted alternately to be moved under the tramper and the ram, rock shafts mounted on opposite sides of the boxes and having spaced fixed retaining dogs arranged to be extended into and to be retracted from the press boxes upon the actuation of the rock shafts, the inner ends of said shafts each having a depending cam, the inwardly situated sides of the boxes each having a plate secured thereto, transversely disposed spaced levers pivotally connected to each plate, the outer ends of said levers being movable into and out of engagement with the cams to actuate the rock shafts, a vertically disposed plunger slidably connected to each plate, means operatively connecting the inner ends of the levers to said plunger, a guide member on the inwardly situated side of each box and provided with an opening through which the plunger extends, yieldable means connecting the levers to the guide plate for urging the outer ends of the levers in engagement with the cams, fixed means on the center post arranged when one of the boxes is moved beneath the tramper for raising the plunger to move the outer ends of the levers away from the cams to permit the free swinging movement of the dogs within the box during the tramping operation, said ram when brought in compressing engagement with the cotton initiating the outward movement of the dogs, said yieldable means upon the movement of the plunger away from the fixed means and the tramper, effecting the engagement of the outer ends of the levers with the cams whereby upon the positioning of the box beneath the ram to position the levers to actuate the cams and coact with the ram to move the dogs out of the box and the path of the plunger during the pressing operation, and means on each of said cams cooperating with the outer ends of said levers to maintain the dogs in their retracted position.

12. In combination with a baling press having a tramper and a ram, a supporting post, press boxes rotatably mounted on said post and adapted alternately to be moved under the tramper and the ram, retaining dogs mounted on the sides of the press boxes and arranged to be extended into and to be retracted from said boxes, actuating means movably connected to the inwardly situated sides of each of said boxes, means for operatively connecting the actuating means to the retaining dogs, means maintaining said retaining dogs in holding engagement with the cotton when each of the boxes is moved under the ram, said ram when brought in compressing engagement with the cotton initiating the outward movement of the dogs, and control means when one of the boxes is positioned beneath the ram for positioning the control means to coact with the ram to move the dogs to their retracted position and for returning the actuating means to its normal position.

13. In combination with a baling press having a tramper and a ram, a supporting post, press boxes rotatably mounted on said post and adapted alternately to be moved under the tramper and the ram, retaining dogs mounted on the sides of the press boxes and arranged to be extended into and to be retracted from said boxes, actuating means movably connected to the inwardly situated sides of each of said boxes, means for operatively connecting the actuating means to the retaining dogs, means maintaining said retaining dogs in holding engagement with the cotton when each of the boxes is moved under the ram, control means for moving the actuating means and the dogs to their retracted position, said ram, when initially brought in pressing engagement with the cotton, effecting the release of the dogs and coacting with said control means to move the retaining dogs out of the path of the ram, and means for maintaining the dogs in their retracted position.

14. In combination with a baling press having a tramper and a ram, a supporting post, press boxes rotatably mounted on said post and adapted alternately to be moved under the tramper and the ram, retaining dogs mounted on the sides of the press boxes and arranged to be extended into and to be retracted from said boxes, actuating means movably connected to the inwardly situated sides of each of said boxes, means for operatively connecting the actuating means to the retaining dogs, means maintaining said retaining dogs in holding engagement with the cotton when each of the boxes is moved under the ram, bagging removably connected to the ram and arranged to be applied to the bale upon the completion of the pressing operation, and control means for moving the actuating means and the dogs to their retracted position, said ram when initially brought in pressing engagement with the cotton, effecting the release of the dogs and coacting with said control means to move the retaining dogs out of the path of the ram and the bagging.

15. In combination with a baling press having a tramper and a ram, a supporting post, press boxes rotatably mounted on said post and adapted alternately to be moved under the tramper and the ram, said boxes having their inner sides located adjacent the post, retaining dogs mounted on each of the press boxes and arranged to be extended into and to be retracted therefrom, said dogs being freely movable within the boxes, vertically disposed actuating means movably connected to the inner sides of each of said boxes, displaceable means for operatively connecting the actuating means to the retaining dogs, means for operating the actuating means to permit the free swinging movement of the dogs when one of the boxes is positioned beneath the tramper, said ram when brought in compressing engagement with the cotton initiating the outward movement of the dogs, and means when the box under the tramper is moved under the ram for positioning the displaceable means so as to coact with the ram to move the dogs to their retracted position.

16. In combination with a baling press having a tramper and a ram, a supporting post, press boxes rotatably mounted on said post and adapted alternately to be moved under the tramper and the ram, said boxes having their inner sides located adjacent the post, retaining dogs mounted on each of the press boxes and arranged to be extended into and to be retracted therefrom, said dogs being freely movable within the boxes, vertically disposed actuating means movably connected to the inner sides of each of said boxes, displaceable means for operatively connecting the actuating means to the retaining dogs, means on said post for operating the actuating means to permit the free swinging movement of the dogs when one of the boxes is positioned beneath the tramper, said ram when brought in compressing engagement with the cotton initiating the outward movement of the dogs and means when the box under the tramper is moved under the ram for positioning the releasable means to coact with the ram to move the dogs to their retracted position.

17. In combination with a baling press having a tramper and a ram, a supporting post, press boxes rotatably mounted on said post and adapted alternately to be moved under the tramper and the ram, said boxes having their inner sides located adjacent the post, retaining dogs mounted on each of the press boxes and arranged to be extended into and to be retracted therefrom, said dogs being freely movable within the boxes, vertically disposed actuating means movably connected to the inner sides of each of said boxes, displaceable means for operatively connecting the actuating means to the retaining dogs, means for operating the actuating means to permit the free swinging movement of the dogs when one of the boxes is positioned beneath the tramper, said ram when brought in compressing engagement with the cotton initiating the outward movement of the dogs, means when the box under the tramper is moved under the ram for positioning the displaceable means to coact with the ram to move the dogs to their retracted position, and means coacting with said last mentioned means to maintain the dogs in their retracted position.

18. In combination with a baling press having a tramper and a ram, a central post, press boxes rotatably mounted on said post and arranged alternately to be moved under the tramper and the ram, rock shafts mounted on opposite sides of the press boxes and having spaced retaining dogs arranged to be extended into and to be retracted from the press boxes, a vertically disposed plunger slidably connected to the inwardly situated side of each press box, a pair of spaced members pivotally connected to each of the inwardly situated sides, means operatively connecting said members to the plunger, means for operatively connecting the outer ends of said pivotal members to the retaining dogs, said ram when brought in compressing engagement with the cotton initiating the outward movement of the dogs, and means for operating the plunger and said members for positioning the members so as to coact with the ram to move the dogs out of the box when the latter is beneath the ram during the pressing operation.

JOHN A. STREUN.